United States Patent
De Schamphelaere

[15] 3,705,978
[45] Dec. 12, 1972

[54] TIME SHARED DIGITAL AND ANALOG PROCESS CONTROL

[72] Inventor: Lucien Amede De Schamphelaere, Edegem, Belguim

[73] Assignee: Agfa-Gevaert, Mortsel, Belgium

[22] Filed: Sept. 9, 1970

[21] Appl. No.: 70,676

[30] Foreign Application Priority Data

Sept. 10, 1969   Great Britain..........44,596/69

[52] U.S. Cl.............................235/151.1, 235/150.5
[51] Int. Cl.............................G05b 6/02, G06j 3/00
[58] Field of Search........................235/151.1, 150.5

[56]  References Cited

UNITED STATES PATENTS 2,932,471   4/1960   Exner et al. .............343/7 ED
3,483,362   12/1969   Feldman et al.........235/150.5

*Primary Examiner*—Malcolm A. Morrison
*Assistant Examiner*—R. Stephen Dildine, Jr.
*Attorney*—William J. Daniel

[57]   ABSTRACT

A digital computer is used in a time sharing technique to control a plurality of control circuits. The frequency of sampling $f_s$ may be low in comparison with the frequency of sampling in conventional direct digital control, and the capacity of the digital computer correspondingly be increased, if each variable in the process is controlled according to an analog control, and the analog reference value in the analog control is derived from a digital reference value which is sequentially corrected in accordance with a correction value which is obtained from the comparison of said digital reference value with a digital value derived from the process.

11 Claims, 5 Drawing Figures

TIME SHARED DIGITAL AND ANALOG PROCESS CONTROL

The present invention relates to a method and a device for the control of several variables for process control purposes.

The accuracy with which the value of a variable in a process control system can be made to correspond to an intended or reference value (set-point) mainly depends on the accuracy of the device for measuring the variable, i.e. the transducer, the linearity of the amplifier which amplifies the output signal of the transducer, the characteristics of the device for producing the reference value, the sensitivity of the comparator for determining the difference between the measurement value and the reference value, i.e. the control error, and the zero drift of the amplifier and/or the integrator of the controller.

The accuracy of the control can be considerably increased in many cases by making use of digital techniques.

As a matter of fact, many variables, e.g. position, velocity, flow-rate, can be measured by transducers which directly produce a digital output. In case where a direct digital measurement is impossible, a convertor, called hereinafter ADC, may be used which converts an analog measurement value into a digital value.

Furthermore, the accuracy of the setting of the reference value only depends on the resolving power of the means, e.g. binary or decimal switches, for producing such value. Also, the accuracy with which the control error may be determined by digital techniques and with which, starting from this error, the proportional, integrating and in somecases also differentiating terms of the output signal of the controller can be derived and summed, is mainly determined by the resolving power of the device for producing the digital reference value, and of the digital transducer or ADC convertor.

A factor which limits the industrial application of digital techniques is the relative high cost of measuring and control apparatus involved in these techniques.

It has been proposed therefore to operate according to a time sharing technique, so that one digital control apparatus may be used for controlling a plurality of variables.

An example of this technique is known as "direct digital control", called hereinafter DDC. The technique comprises the use of a digital computer for carrying out the required calculations and for storing reference values, measuring parameters, intermediate results, etc.

Besides the advantage of a high static control accuracy, DDC offers many other advantages only a few of which are indicated hereinafter.

The computer can take care of accurate checking of limit values of the measured values, control errors and output signals without need for additional hardware.

Data logging can be done with only limited additional apparatus.

Reference values, limit values and measuring parameters can be automatically set and modified.

The computer may be used for so-called adaptive or optimizing control. Since the reference values of the different control circuits are present in the memory of the computer, the communication between the adaptive or optimizing controller and the ordinary controllers can occur without additional hardware.

In spite of the advantages which have been mentioned hereinbefore, the introduction of digital techniques into process control systems becomes only economically acceptable if the number of control circuits which is handled by one digital control apparatus, is great.

However, in conventional DDC the number of circuits which can be handled by a digital computer is limited for the following two major reasons.

First, the introduction of time sharing techniques no longer permits a continuous flow of information in the different control circuits. To obtain stability of control, the frequency of sampling $f_s$ must be high in comparison with the undamped resonant frequencies of the closed control loops. The term "frequency of sampling" means the number of samplings carried out per unit of time. In the further description the minute will be used as said unit of time. It is generally admitted that $f_s$ should be at least 8 times greater than the undamped resonant frequency of the control circuit. A common value of $f_s$ in industrial applications of DDC is situated between 6 and 60 samplings per minute, but higher values of $f_s$ are required in the case where very fast changing variables, e.g. speed or position, are to be controlled. Since each control circuit requires a certain calculation time on the computer, it will be understood that the number of circuits which can be handled by the computer will be inversely proportional to the resonant frequencies of said circuits.

Second, the core store of the computer forms a limit for the number of control circuits which can be handled by the computer. As a matter of fact, a considerable quantity of data must be stored in the memory of the computer for each connected variable. These data include the information which determines the manner in which the received measuring signal must be linearized and compensated, the information required for the calculation of the output signal such as reference value, measurement parameters, previous value of the measurement value, previous value of the time integral of the control error, etc., and finally the information which relates to the checking of the limit values of the control error, the measured value and of the output signal. All this information is normally stored in the core store of the computer, because the relatively high sampling frequency $f_s$ would make it unpractical to store this information in a back-up memory device.

Finally, it should be mentioned that if a digital computer is used in the control of a complex manufacturing process, there may be good reasons for not using all the available calculation time and the complete memory capacity of the computer for ordinary control. Thus it may be desirable to keep a considerable part of the capacity of the computer free for control functions at a higher level such as adaptive and optimizing control, and for special calculations in respect of production management.

The present invention aims to provide a method which permits the number of variables which may be handled by one digital measuring and control device to be considerably increased while maintaining all the advantages which are offered by digital control techniques.

According to the present invention a method for controlling a plurality of variables in a process comprises:

a. sequentially comparing a digital reference value ($r_d$) for each variable in the process with a digital value ($m_d$) derived from the process in order to produce a control error ($e_1$), b. feeding each said control error ($e_1$) sequentially to a digital computer in order to produce a corresponding correction value ($u_1$), c. correcting each digital reference value ($r_d$) sequentially in accordance with the corresponding correction value ($u_1$), d. deriving a corresponding analog reference value ($r'_a$) from each corrected digital reference value, e. continuously measuring the actual value ($m_a$) of each variable in the process according to an analog measurement and comparing it with the corresponding derived analog reference value ($r'_a$), and f. feeding the control error ($e_2$) resulting from the comparison between both values to an analog controller which controls the corresponding variable in the process.

The digital value ($m_d$) may either be directly produced by a digital transducer, or be obtained by the conversion of the analog signal produced by an analog transducer into a digital signal by means of an ADC convertor.

Whereas analog control offers no high static accuracy but a quick response, digital control is very accurate but has a slower correction effect, and it thus will be apparent that both controls may supplement each other in an almost ideal way.

A device for controlling a plurality of variables in a process may comprise according to the present invention:

a. an analog controller ($C_2$) for each variable in the process (P), b. a generator (R) which produces a digital reference value ($r_d$) for each variable, c. means which produces a digital measured value ($m_d$) for each variable in the process, d. comparator means ($S_1$) which compares the digital reference value ($r_d$) with the digital value ($m_d$) of a variable and which produces an error signal ($e_1$), e. a digital controller ($C_1$) and means for connecting sequentially the different error signals ($e_1$) to the input of said controller, f. means for connecting the correction output signals ($u_1$) produced by the digital controller sequentially to summers $S_3$, one summer being provided for each variable in the process, and each summer adding the signal ($u_1$) to the corresponding digital reference value ($r_d$) to produce a corrected reference signal ($r'_d$).

The invention will be described hereinafter by way of example with reference to the accompanying drawings wherein.

Figure 1:
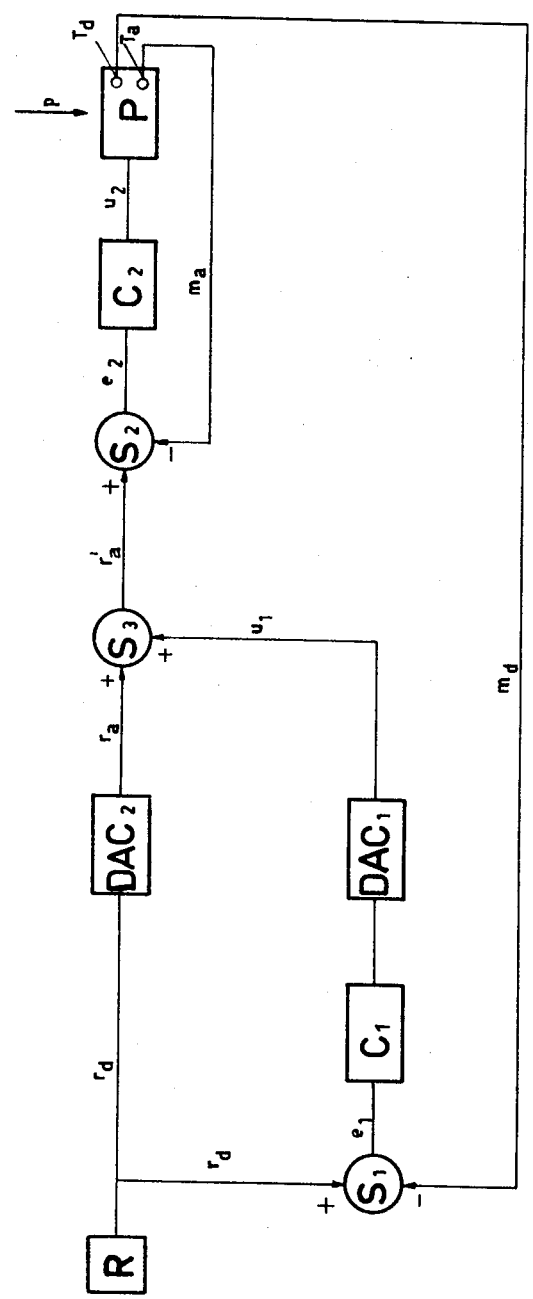
FIG. 1 is a block diagram of one control circuit.

In FIG. 1 the block diagram of only one control circuit is shown in order to facilitate the description of the invention.

The diagram comprises the following main elements.

A process P which must be controlled since it may be disturbed by influences p. The process P may be, for instance, a photographic coating process wherein the speed of a web must be controlled. The actual speed is measured by transducers $T_d$ and $T_a$ which produce a digital measurement signal $m_d$, and an analog measurement signal $m_a$, respectively.

An analog controller $C_2$ which receives at its input the error signal $e_2$ and which produces an output signal $u_2$ which directly influences the process P in the required sense; i.e. to reduce the error signal $e_2$.

A comparator $S_2$ which compares the analog reference value $r'_a$ with the measured analog value $m_a$ and produces the control error signal $e_2$.

A generator R which permits a desired digital reference value $r_d$ to be produced which, in the present case, may represent the desired speed of the web in the process P.

A digital to analog convertor $DAC_2$ which converts the signal $r_d$ into an analog signal $r_a$.

A comparator $S_1$ which compares the digital reference signal $r_d$ with the digital measurement value $m_d$, and produces a digital error signal $e_1$.

A digital controller $C_1$ which receives at its input the error signal $e_1$, and which produces a digital output signal. Said digital controller may be, and preferably is, a conventional multi-purpose digital computer.

A convertor $DAC_1$ which converts the digital output of $C_1$ into an analog signal $u_1$.

Finally, a summer $S_3$ which adds the signal $u_1$ to the analog equivalent $r_a$ of the reference signal $r_d$, to produce the corrected reference signal $r'_a$.

In the operation of the described control circuit, the function of the controllers $C_1$ and $C_2$ is as follows. The analog controller $C_2$ is capable of responding quickly to possible changes of the reference value $r_d$ and to disturbances p in the process P, but no high static accuracy is required of said controller. As a consequence of the latter feature, no stringent requirements are to be put to the accuracy, the linearity and the drift of the transducer $T_a$ and the amplifier which may be required to produce the output $m_a$, the comparator $S_2$, the converter $DAC_2$, and the amplifier and/or integrator which may be incorporated in $C_2$.

The digital controller $C_1$, on the contrary, may have a response which is relatively slow but is inherently constant as compared with the static accuracy of the analog control system which is liable to change rapidly. The output of $C_1$ is converted into an analog signal $u_1$ which is added to the analog equivalence of the reference value $r_d$, in order to produce the corrected reference signal $r'_a$ which corrects the static inaccuracy of the analog control circuit. This correction is based on the high static accuracy of digital control and on the integrating characteristics of $C_1$.

Thus, controllers $C_1$ and $C_2$ behave differently but, when applied in the technique of process control as described hereinbefore, they virtually complement each other.

It is important for the accuracy of the control system that $C_1$ should have an integrating characteristic. In most cases this integrating characteristic will suffice for the proper working of the control without need for $C_1$ to possess more complex control characteristics.

A controller with integrating action is characterized by its repetition frequency $K_t$ which indicates how many times the output signal of the controller increases with a value which corresponds to the value of the input signal, per unit of time.

Figure 2:
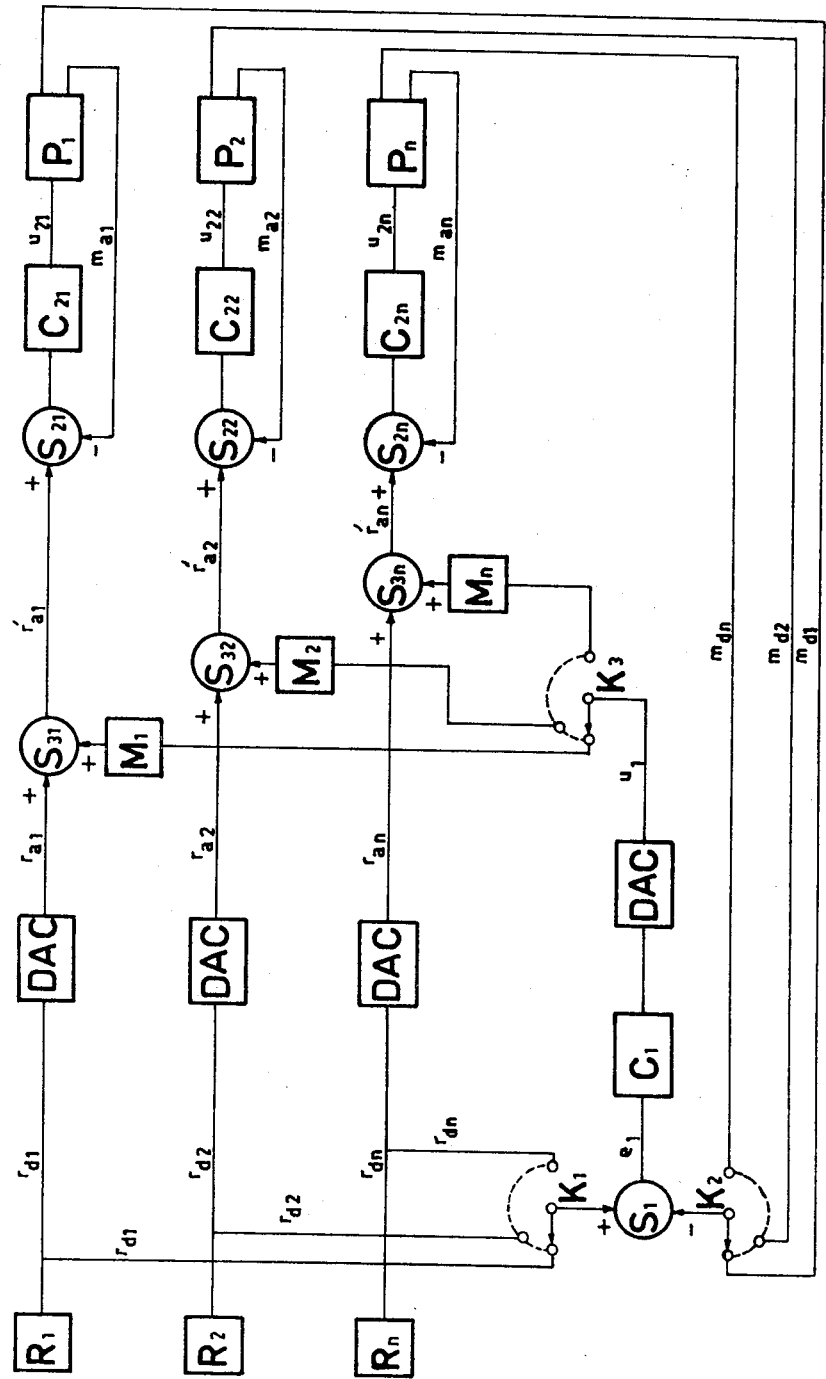
FIG. 2 is a block diagram of a plurality of control circuits.

If a controller $C_1$ which has only an integrating characteristic works in time sharing for the correction of several analog controllers, such as shown in FIG. 2, a sampling frequency $f_s$ which is about 10 times higher than the repetition frequency $K_t$ provides a stable control.

It is precisely on account of this feature that the method according to the present invention is advantageous over conventional DDC. Whereas in DDC the minimum value of $f_s$ is determined exclusively by the process characteristics, said value is determined in the present method by an adjustable factor $K_t$.

Although $K_t$ and thus also $f_s$, may theoretically be chosen very low, they shall preferably be taken not lower than 0.1 period per minute in practice, unless the process does require otherwise. As a matter of fact, for frequencies lower than $K_t$ the digital controller $C_1$ is no longer effective and the controlling function is taken over completely by the analog controller. However, an analog controller which has a good low-frequency response necessarily is complicate and costly. In addition, in view of a good process control it is not desirable that $f_s$ should be lower than 1 period per minute.

The result of all this is that the sampling frequency $f_s$ in a circuit as shown in FIG. 2 which now will be described may be 10 to 100 times lower than in common DDC, and the time which a computer must spend on the calculations for a number of variables, is accordingly reduced by a factor of 10 to 100.

The block diagram of FIG. 2 represents a control arrangement for controlling $n$ variables in processes P, only three of which have been shown. The circuit of each process has an associated DAC convertor for the digital reference value $r_d$ set at the devices R, a summer $S_3$, which adds to the analog reference signal $r_a$ the correction value $u_1$ stored in an analog memory M, e.g. a capacitor, and a comparator $S_2$. The memory M is required for storing the analog value $u_1$ between two successive samplings. The digital control in the circuit occurs through the intermediary of only one digital control device $C_1$ which is connected successively into the different loops by switch means, represented in the figure in the form of an ordinary step switch K but which in practice will comprise solid state switches. The digital controller $C_1$ is also provided with memory circuits for storing the time integral of the control error of the different control circuits.

It will be understood that in the present arrangement the digital control is imparted periodically and sequentially. It is clear that the digital controller $C_1$, e.g. digital computer, is capable of controlling a plurality of circuits or, as the case may be, can spend a part of its time dealing with other problems.

The lowering of the sampling frequency $f_s$ to 1 period per minute or even less, as mentioned hereinbefore, has also another important aspect. As a matter of fact, at such low sampling frequency it becomes possible to store the loop data, which in an ordinary DDC form a heavy lead for the core store, in a back-up memory and to introduce them sequentially and group-wise into the core store for carrying out the calculations. If for a determined group of control circuits the calculations have been carried out and the new correction values $u_1$ have been transmitted to the corresponding analog control circuits $C_2$, the loop data are stored again in the back-up memory so that the core store is released for receiving the data of a next group of control circuits. The grouping of the control circuits can occur, for instance on the basis of process divisions. This means that one digital computer can control, for instance in the photographic industry, an extrusion line for the extrusion, the stretching, and the heat-treatment of polyethylene terephthalate film, several coating lines, each line including different coating stations and a drying station, etc.

It will be understood that in the arrangement of FIG. 2, and also in the arrangements of FIGS. 3 and 4 to be described hereinafter, the devices $R_1$ to $R_n$ actually are not present in the form of separate units as shown in the diagrammatic representations, but that they form cells of the computer $C_1$ wherein the corresponding reference values $r_d$ are stored.

Figure 3:
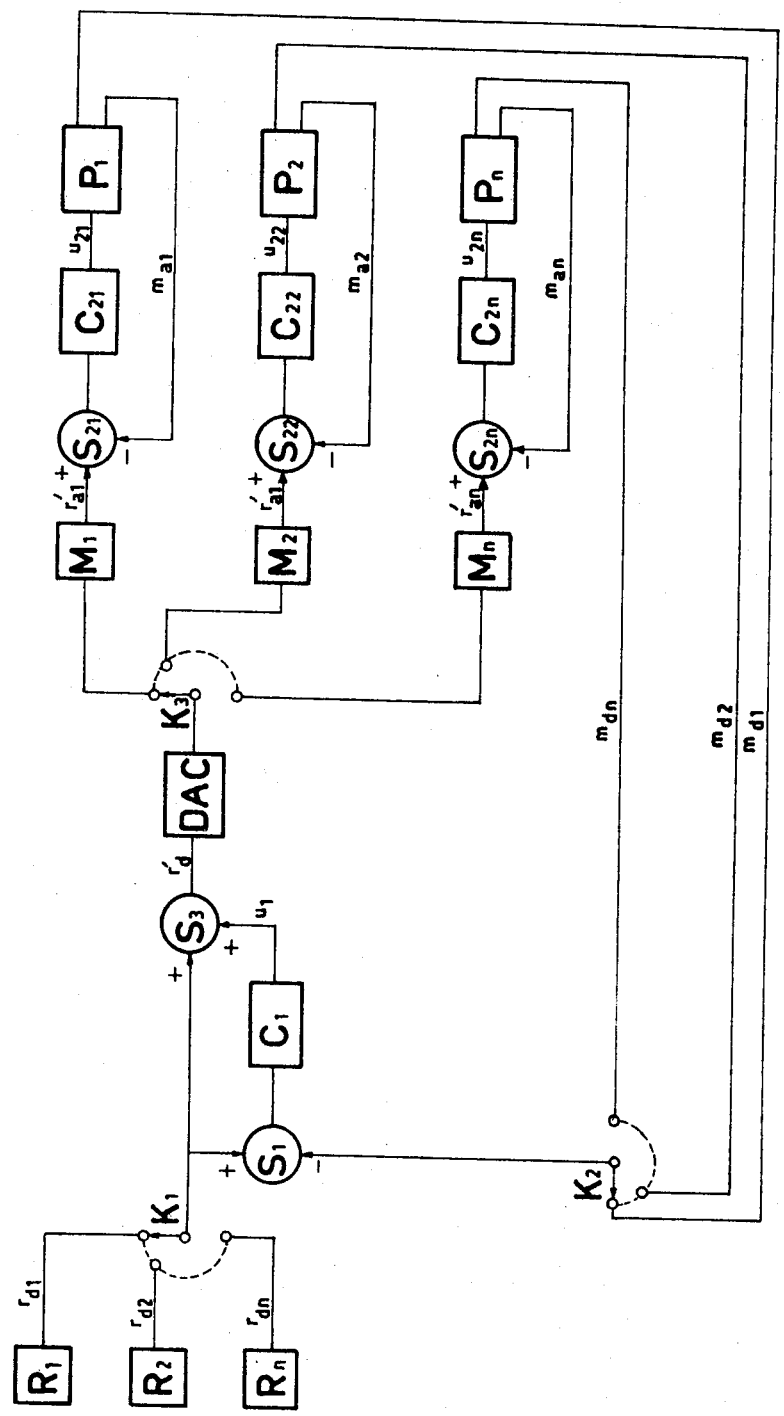
FIG. 3 is a block diagram of several control circuits, wherein only one DAC convertor is used.

FIG. 3 shows diagrammatically that the summing of the reference value $r_d$ and the correction value $u_1$ can also be done by digital techniques so that the DAC converters which in the arrangement of FIG. 2 are required for each control circuit, may be omitted. The memory circuits M now store the last value of $r'_a$ between two successive samplings.

The summing of $u_1$ and $r_d$ is actually done by the digital controller $C_1$ itself. As a consequence thereof, it is preferred to incorporate in said controller a priority mechanism which permits a change in the reference value of a given control loop to be transmitted to the memory element concerned as soon as this change occurs. If the transmission of a change in the reference value were delayed until the next sampling sequence, the reaction of the analog controller would be unnecessarily delayed.

In a modified arrangement, it is possible that the digital controller $C_1$ calculates the increments of two successive values of $r'_a$ rather than $r'_a$ itself. In such case the analog memory of each control circuit must be replaced by an analog integrator, which totalizes the different increments.

Figure 4:
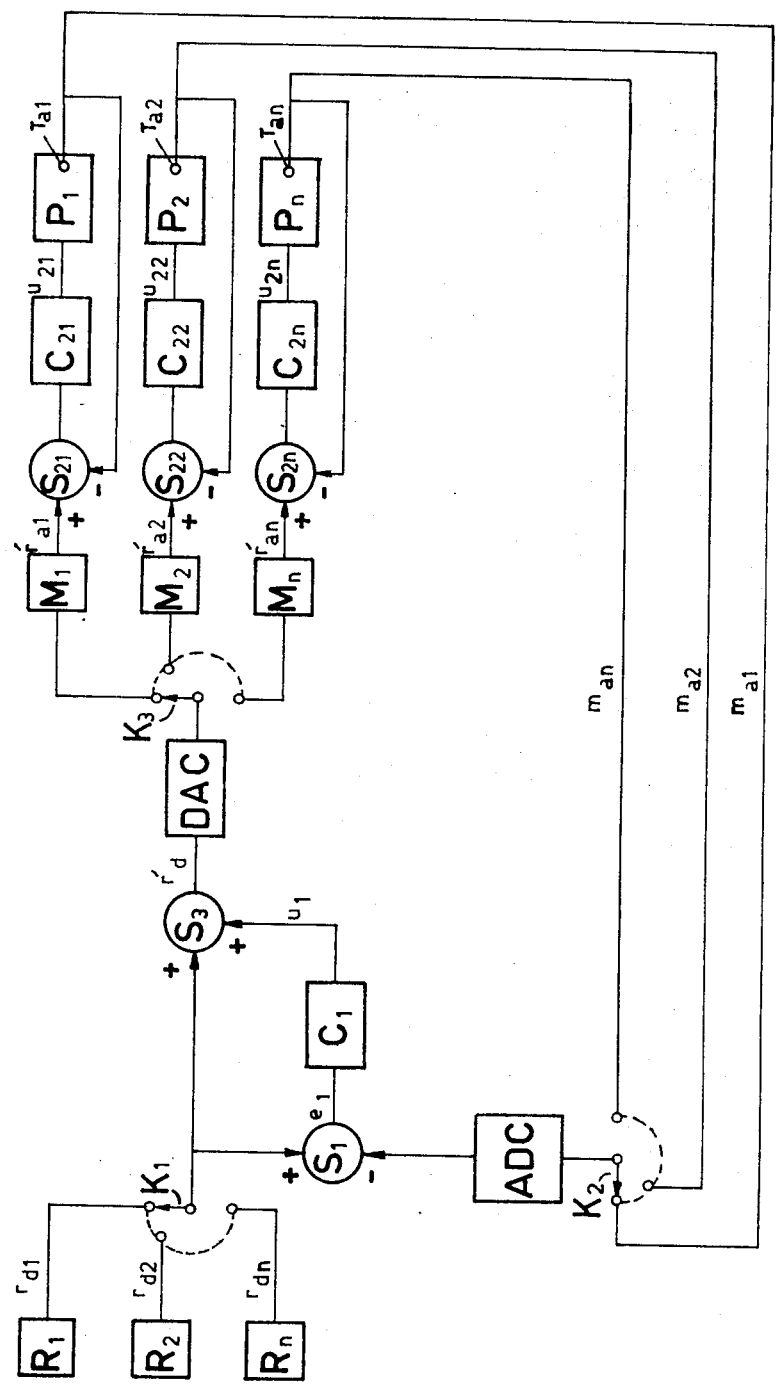
FIG. 4 is a block diagram of several control circuits, wherein only an analog transducer is provided for each control circuit.

In FIG. 4, a simplified arrangement is shown wherein for the variable in each process only an analog transducer $T_a$ is provided. The analog measurement values $m_a$ are converted into a digital value by an ADC converter which is provided between the switch $K_2$ and the comparator $S_1$.

An additional advantage of the arrangements according to FIGS. 3 and 4 over conventional DDC is that in case of defect of the digital controller, all different loops remain under the continuous control of the analog controllers. The memory elements M keep the last produced value $R'_a$.

Figure 5:
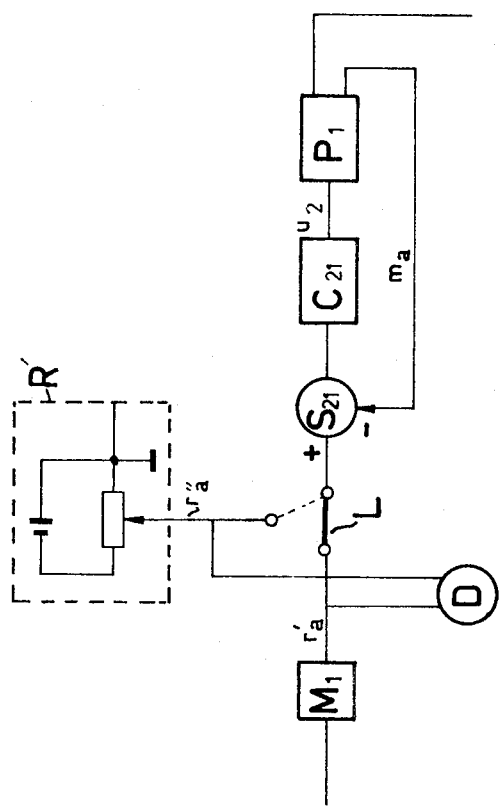
FIG. 5 is a block diagram of one improved circuit of the arrangement of FIG. 4.

In order to ensure that the zero drift of the analog memories or of the integrators, which may become considerable after prolonged defect of the digital controller, does not introduce serious errors in the process being controlled, it may be desirable to provide the possibility for each analog controller in FIG. 3 or 4 to be switched over to an additional device which produces a definite predetermined analog reference value. In order to permit a smooth transition, the analog reference signal must previously be modified temporarily to correspond with the signal $r'_a$ stored in the memory element M. The electric circuit for one process is shown in FIG. 5 in which a switch L is provided which permits the input of comparator $S_{21}$ to be switched from the memory $M_1$ to the device R' wherein an analog reference value $r''_a$ may be set. A comparator D is connected between the output of $M_1$ and R' and permits the adjustment of R' so that the produced analog reference value $r''_a$ is equal to $r'_a$. The comparator D may be a differential voltmeter.

The circuits R' may be simple so that the provision of one circuit per process does not materially increase the complexity of the arrangement. Only one comparator D is required, since it may be provided with appropriate switch means for successive connection into the different circuits R' as they must be adjusted.

In the same way, a switched indicator may be provided for indicating the output signals $u_2$ of the different controllers $C_2$.

Finally, it should be understood that the method of correcting different analog controllers by means of one digital controller according to the present invention, may also be used if the analog control loops include feed-forward correction or if they contain means for eliminating interaction between different variables.

I claim:

1. A method for controlling a plurality of variables in a process which comprises:
   a. sequentially comparing a digital reference value $(r_d)$ for each variable in the process with a digital value $(m_d)$ observed in the process in order to produce a control error $(e_1)$,
   b. feeding each control error $(e_1)$ sequentially to a digital computer in order to produce a corresponding correction value $(u_1)$,
   c. correcting each digital reference value $(r_d)$ sequentially in accordance with the corresponding correction value $(u_1)$,
   d. deriving a corresponding analog reference value $(r'_a)$ from each corrected digital reference value,
   e. continuously measuring the actual value $(m_a)$ of each variable in the process according to an analog measurement and comparing it with the corresponding derived analog reference value $(r'_a)$ to produce a control error $(e_2)$, and
   f. feeding the control error $(e_2)$ resulting from such comparison to an analog controller which controls the corresponding variable in the process.

2. Method according to claim 1, wherein the digital value $(m_d)$ is directly measured in the process.

3. Method according to claim 1, wherein the digital value $(m_d)$ is obtained by converting an analog measured value of a variable in the process into a corresponding digital value.

4. Method according to claim 1, wherein the correction value $(u_1)$ is an analog signal and the digital reference value $(r_d)$ is converted into an analog signal $(r_a)$ before it is corrected by the analog signal $(u_1)$.

5. Method according to claim 1, wherein each correction value $(u_1)$ is stored during the sequential operations of the digital computer.

6. Method according to claim 1, wherein each corresponding analog reference value $(r'_a)$ is stored during the sequential operations of the digital computer.

7. A device for controlling a plurality of variables in a process which comprises:
   a. an analog controller $(C_2)$ for each variable in the process
   b. a generator (R) which produces a digital reference value $(r_d)$ for each variable,
   c. means which produces a digital measured value $(m_d)$ for each variable in the process,
   d. comparator means $(S_1)$ which compares the digital reference value $(r_d)$ with the digital measured value $(m_d)$ of a variable and which produces an error signal $(e_1)$,
   e. a digital controller $(C_1)$ and means for connecting sequentially the difference error signals $(e_1)$ to the input of said controller to produce correction output signals $(u_1)$,
   f. means for connecting the correction output signals $(u_1)$ produced by the digital controller sequentially to summers one summer being provided for each variable in the process, and each summer adding the correction signal $(u_1)$ to the corresponding digital reference value $(r_d)$ to produce a corrected reference value $(r'_d)$,
   g. convertor means which converts each said corrected digital reference value into a corresponding analog value $(r'_a)$
   h. means for producing an analog measured value $(m_a)$ for each variable in the process, and
   i. comparator means $(S_2)$ which compares said derived analog value $(r'_a)$ with the measured analog value $(m_a)$ for each variable, and which produces an error signal which controls the corresponding analog controller $C_2$.

8. A device according to claim 7, wherein said digital controller $C_1$ is a general purpose digital computer.

9. A device according to claim 7, wherein said means for producing a digital measured value $(m_d)$ for each variable in the process comprises an analog to digital converter (ADC) which converts an analog value $(m_a)$ of a variable measured in the process into a corresponding digital value.

10. A device according to claim 7, wherein a memory circuit is provided for each variable to be controlled which stores the correction output signal $(u_1)$ produced by the digital controller $C_1$ for each variable.

11. A device according to claim 7, wherein a memory circuit is provided for each variable to be controlled in the process, and each said memory circuit stores the analog value $(r'_a)$, corresponding with the corrected digital reference value, which is fed to a corresponding comparator $S_2$.

* * * * *

UNITED STATES PATENT OFFICE
CERTIFICATE OF CORRECTION

Patent No. 3,705,978     Dated December 12, 1972

Inventor(s)   Lucien Amede De SCHAMPHELAERE

It is certified that error appears in the above-identified patent and that said Letters Patent are hereby corrected as shown below:

Claim 7, Column 8, line 28, after "summers", insert --

$S_3$, --.

Signed and sealed this 1st day of May 1973.

(SEAL)
Attest:

EDWARD M. FLETCHER, JR.            ROBERT GOTTSCHALK
Attesting Officer                  Commissioner of Patents